May 14, 1963 G. H. FRITZINGER 3,089,705

SHEET-RECORD MACHINE

Original Filed May 2, 1956 4 Sheets-Sheet 1

INVENTOR

George H. Fritzinger

May 14, 1963 G. H. FRITZINGER 3,089,705

SHEET-RECORD MACHINE

Original Filed May 2, 1956 4 Sheets-Sheet 2

INVENTOR

George H. Fritzinger

INVENTOR
George H. Fritzinger

INVENTOR
George H. Fritzinger

United States Patent Office 3,089,705

Patented May 14, 1963

3,089,705

SHEET-RECORD MACHINE

George H. Fritzinger, West Orange, N.J., assignor to McGraw-Edison Company, Elgin, Ill., a corporation of Delaware Original application May 2, 1956, Ser. No. 582,152, now Patent No. 2,966,357, dated Dec. 27, 1960. Divided and this application May 27, 1960, Ser. No. 32,471
9 Claims. (Cl. 274—20)

This application is a division of my pending application Serial No. 582,152, filed May 2, 1956, and entitled Sheet Record Machine, issued December 27, 1960 as Patent Number 2,966,357.

This invention relates to phonographic machines of the type using a flexible magnetic sheet record medium, and particularly the invention relates to improvements in returning the head carriage during the ejecting and reloading of sheet records in sheet record machines in which automatic record changing is effected and continuity of operability is achieved.

The various features of my invention have been co-ordinated into an integrated machine adapted to eject and reload automatically in one operation without introducing any appreciable recording gap between successive records. This continuous operation is accomplished by ejecting the used sheet record during normal forward drive of the record support and by feeding the next sheet record from a magazine and attaching it to the record support during the ejecting operation directly behind the record being ejected to as to provide continuity of the record medium past the translating-head carriage. The automatic eject-reload cycle is initiated when the carriage approaches the end of its travel, and during that cycle the carriage is impelled to a start position so as to provide for a substantially uninterrupted recording operation from one record to the next. It is to be noted that no unnecessary limitation of the separate features of the invention to the overall machine herein described is intended since the individual features may have useful application by themselves as well as in other combinations.

It is an object to provide a sheet-record dictating machine having automatic record-changing means adapted to enable substantially continuous recording of a series of sheet records without introducing any appreciable recording gaps between records.

A further object is to provide new and improved machines for selectively backspacing the carriage step by step, as desired, and for automatically returning the carriage with an impulsive movement to start position when it reaches an end zone of its travel.

Another object is to provide a simple and novel control system for carrying out an eject-reload cycle and for returning the carriage, all in one operation.

Another object is to provide an alternative control system particularly useful in remotely-controlled dictation-recording systems wherein my invention is employed, which is adapted to initiate the eject-reload cycle upon return of the start-stop control to stop position after the carriage has entered an end zone of its level.

These and other objects and features of my invention will be apparent from the following description and the appended claims.

In the description of my invention reference is had to the accompanying drawings, of which:

Figure 1:
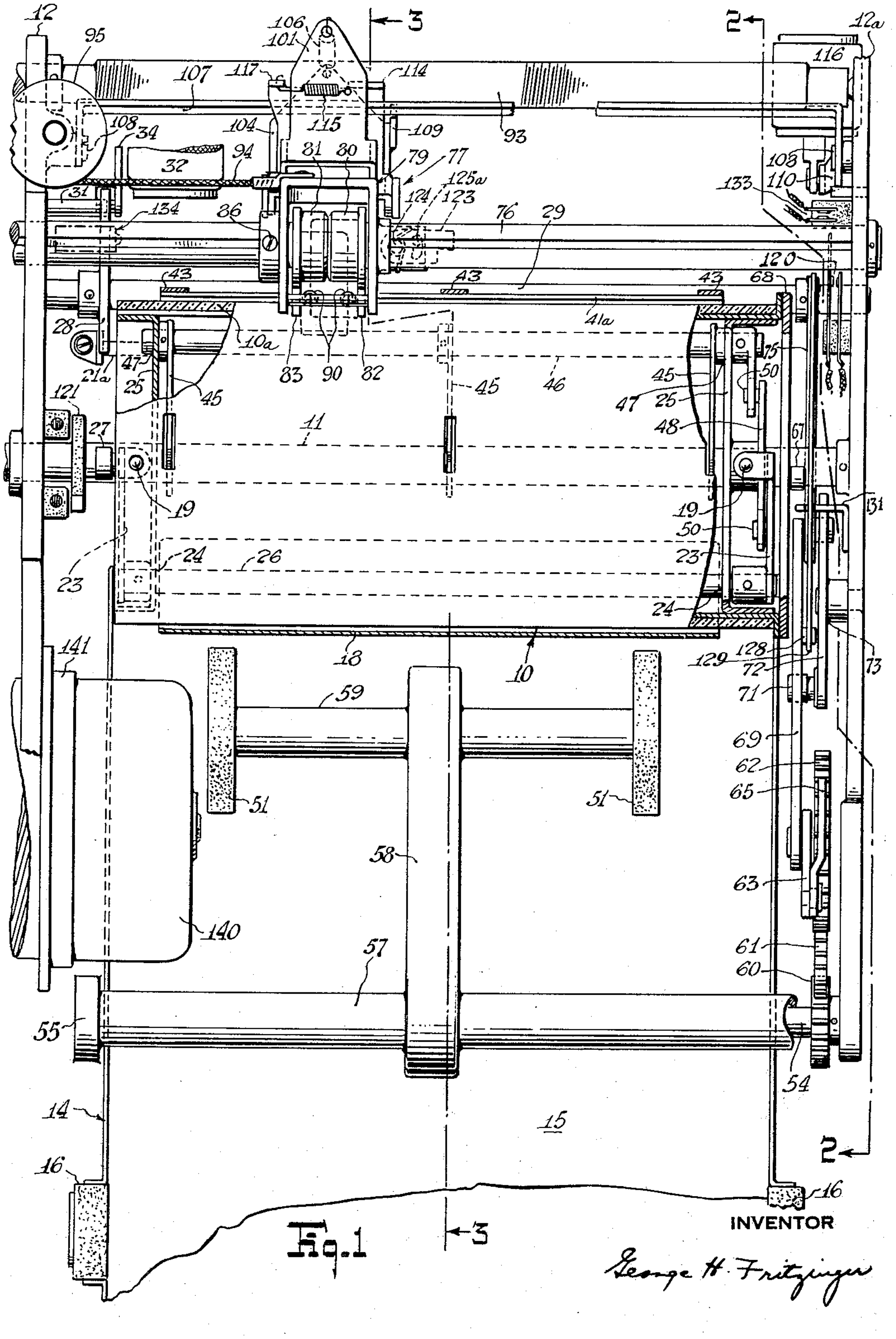
FIGURE 1 is a fractional, top plan view of a phonographic machine incorporating my invention, the machine being shown with the cover removed and with portions broken away for the better illustration of internal parts.

The present machine has a record-supporting drum 10 in the rearward portion thereof provided with a resilient peripheral layer **10*a* of a material such as rubber. The drum is carried by a shaft 11 journaled in left and right standards 12 and 12*a* upstanding from a base 13. A magazine 14 is provided on the base in front of the drum for receiving a stack of sheet records 15. This magazine, which may be of the type used in duplicating machines, comprises a tray of the width of the sheets having rubber pads 16 at the sides for frictionally gripping the stack and releasably holding the sheets in place. Alternatively, the side pads may be dispensed with and the sheets may be retained in place by inclining the tray upwardly according to well-known practice, this being however not herein shown. The bottom wall of the tray is inclined upwardly at 17 just to the rear of the stack and continues horizontally to a point directly below the drum. From this point onwardly there is an arcuate guide structure 18 concentric with the drum at a spacing of about 1/16" therefrom or less. The drum has two drive pins 19 in the end portions thereof for engaging oblong holes 20 (FIGURE 8) in the leading corners of the sheet record R. These drive pins project beyond the guide structure 18 but the guide structure does not interfere since it does not extend the full length of the drum between the pins as shown in FIGURE 1. Directly below the drum in the path of the drive pins there are cantilever springs 21 secured to the underside of the magazine 14 and normally defined in their positioning by stop pins 21*a*** on the frame of the machine at the rear ends of the springs. These springs are provided with long slots 22 (FIGURE 5) through which the drive pins pass as the drum is advanced in a counterclockwise direction as it appears for example in FIGURE 2. However, when a sheet record is fed from the magazine into a loading position wherein the drive pins are directly below the axis of the drum, the drive pins will first engage the portion of the sheet record leading forwardly to the drive holes and will cam the spring fingers 21 downwardly until the drive pins come into registration with the holes, whereupon the springs will snap upwardly to engage the sheet with the drive pins. This action takes place during the normal forward advance of the drum. In the continuing forward advance of the drum the sheet record is wrapped thereon. A butt-joint relation of the leading and trailing edges of the sheet record is preferred but a slight overlap is permitted, if desired, without interfering with the automatic ejection of the sheet record herein next described.

Figures 2, 3, 4:
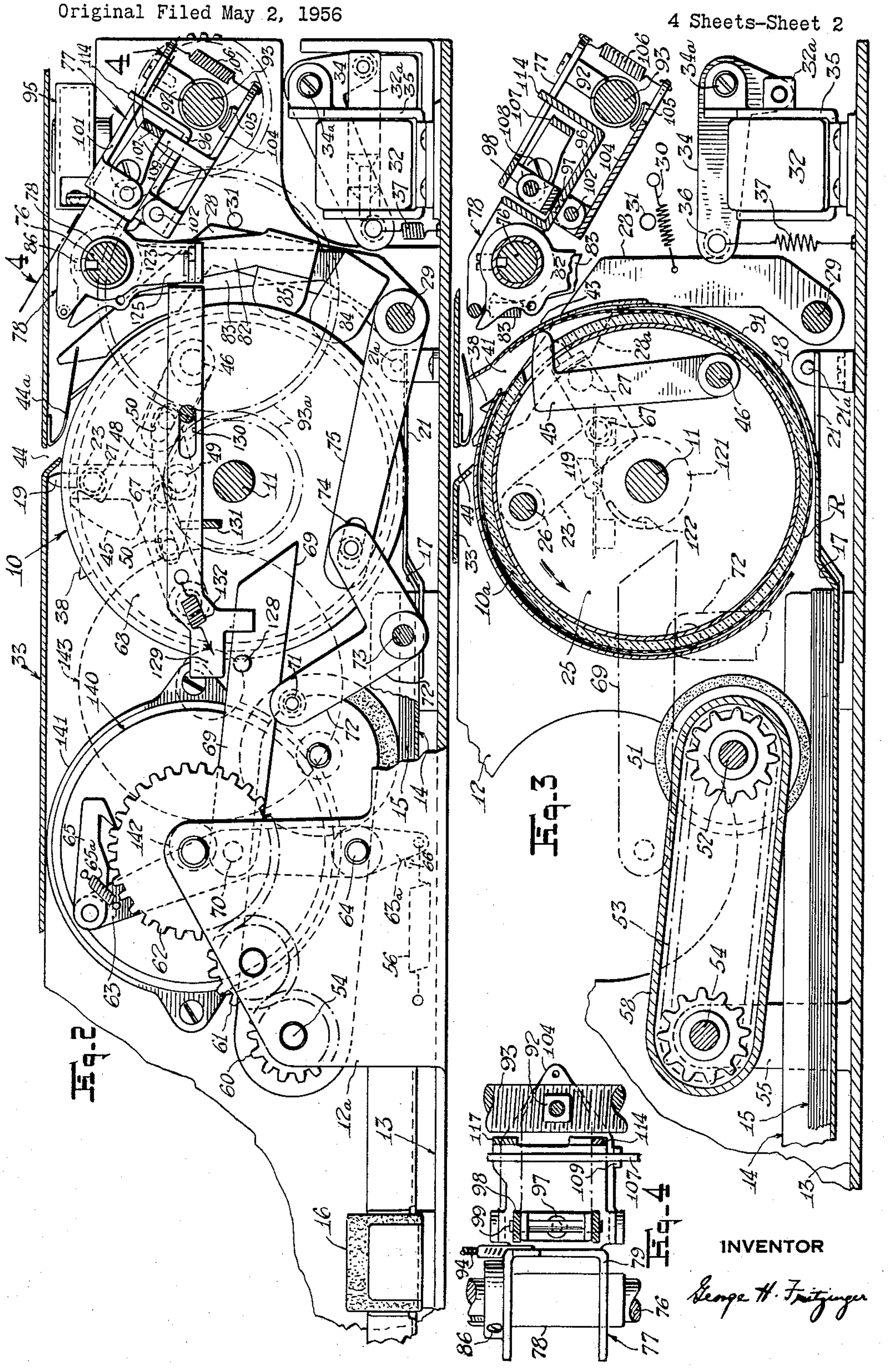
FIGURE 2 is a fractional, vertical sectional view taken through the righthand portion of the machine substantially on the line 2—2 of FIGURE 1.
FIGURE 3 is a fractional, vertical sectional view taken centrally through the machine substantially on the line 3—3 of FIGURE 1.
FIGURE 4 is a sectional view of the translating-head carriage as seen approximately from the line 4—4 of FIGURE 1.

A sheet-record ejecting operation is carried out in accordance with the present invention by releasing the drive engagement at the leading edge and then pushing the sheet forwardly with the drum from its trailing edge so as to direct the sheet record through an ejecting slot during the normal forward drive of the drum. For this purpose the drive pins 19 are mounted on levers 23 pivoted at 24 to walls 25 of the drum inset from the ends thereof as shown in FIGURES 1, 2 and 3. The levers are interconnected by a shaft 26 for unitary movement. Journaled to the lever 23 at the left end of the drum is a roller 27 which projects beyond the drum. In line with the path of this roller rearwardly of the drum is a cam lever 28 mounted on a shaft 29 extending the width of the machine and journaled at its ends in the standards 12 and 12*a* on the base 13. This cam lever extends vertically from its pivot axis to the height of the drum and is urged rearwardly by a spring 30 against a stop in 31 (FIGURES 2 and 3). The cam lever is shiftable forwardly into an operate position in the path of the roller 27, as shown in FIGURE 3, by means comprising a solenoid 32 having its armature 32a connected to a bell crank lever 34 pivoted at 34*a* in a mounting bracket 35. When the solenoid is energized the lever 34 is shifted from the position it occupies in FIGURE 2 to the horizontal position it occupies in FIGURE 3 to move the cam lever 28 forwardly by means of a roller 36 on the lever 34 operating against the back edge of the cam lever. The cam lever 28 has a cam face 28*a* which is arcuate about the shaft of the drum when the cam lever is in its operate position and which extends through a range of approximately 45°. In response to the forward rotation of the drum the roller 27 engages the cam face 28*a* after the cam lever has been moved into its operate position and by this engagement the levers 23 are shifted to retract the drive pins throughout about one-eighth of one revolution of movement of the drum. The drive pins will immediately return as the roller 27 rides off of the cam lever, but disengagement of the leading edge will already have occurred and ejection of the sheet record will havee started, as will appear. When the solenoid 32 is next deenergized the lever 34 is returned by a spring 37 and the cam lever 28 is returned by the spring 30.

When the drive pins are receded the sheet record is still moved with the drum by means of a pair of fixed pins 38 on the drum circumferentially in line with the drive pins but positioned ahead of the drive pins with respect to the direction of advance of the drum. These pins 38 are normally free of the mounted sheet record but come to bear against the leading edge 40 of the notches 39 as soon as the drive pins are receded so as to push the record forwardly with the drum from its trailing edge.

Figure 8:
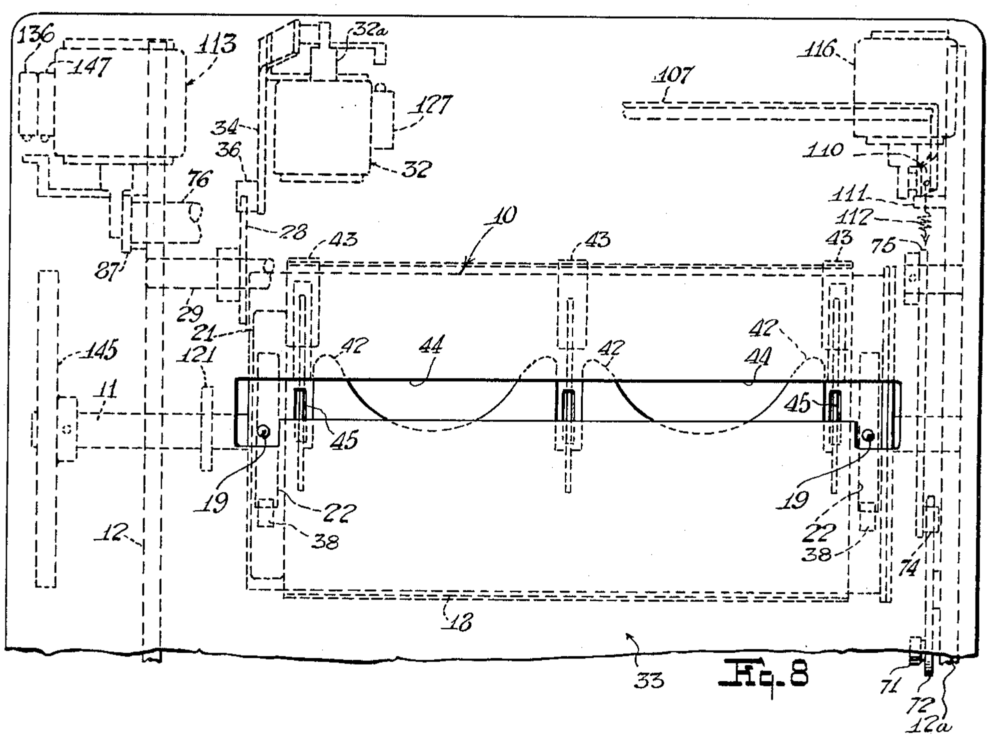
FIGURE 8 is a top plan view of the rearward half of the machine showing the cover of the housing in place and showing dottedly the arrangement of certain internal parts.

In the range of traveling movement of the drive pins whtile they are in their receded positions, the surrounding guide structure 18 has an opening 41 throughout its dimension lengthwise of the drum. This opening is defined by a straight horizontal edge 41a at the bottom and by three slotted stripping fingers 42 at the top. Continuity of the guide structure about the drum is, however, maintained by three arcuate cantilever springs 43 secured to the lower guide structure and bearing lightly against the stripping fingers. An exit slot 44 leads from the opening 41 through the top cover structure 33 of the cabinet (FIGURES 2 and 8).

To assure start of ejection of the sheet record, leading edge first, when the drive pins are receded, the leading edge is displaced positively away from the drum by a distance greater than the spacing of the stripping fingers 42 from the drum. This is accomplished by three respective displacing arms 45 positioned within the drum in line with the springs 43 and movable into outward positions through narrow peripheral slots in the drum. These displacing arms are mounted rigidly on a shaft 46 pivoted at 47 in the end walls of the drum (FIGURES 1 and 3). The displacing arm at the right end of the drum is coupled to the respective drive pin lever 23 by a rocker 48 pivoted at 49 to the right end wall of the drum and having pin-slot connections 50 at its ends to the lever 23 and respective arm 45. When the drive pins are in projecting positions, the displacing arms are receded as shown in FIGURE 2, but as the drive pins are receded the displacing arms are shifted outwardly to displace the leading edge of the sheet record and to press the same against the respective closing springs 43 to open the way for guiding the sheet record from the drum through the exit slot 44, with the displacing arms passing through the slots in the stripping fingers 42. Although the springs 43 will close as soon as the displacing arms are moved therefrom, pressure of the springs is made light so as not to interfere with the continuing progressive ejection of the sheet record from the drum as the drum continues through the ejecting revolution of movement. Although the push pins 38 are set ahead of the trailing edge of the sheet record, a complete ejection is accomplished by confining the sheet record at a distance not greater than the length of the pins 38 from the drum in the travel of the sheet record from the opening 41 in the guide structure to the exit slot 44, this confinement being accomplished by a guide spring 44*a* on the underside of the cover structure 33 to the rear of the slot 44, as shown in FIGURES 2 and 3.

The mechanism for feeding a sheet record into loading position may be of a standard type such as is used for feeding paper sheets in duplicating machines. It may comprise, for example, two rubber-tired rollers 51 on a cross shaft 52 coupled by a belt 53 to a cross shaft 54 extending crosswise of the machine and journaled at its ends in a standard 55 at its left end and the standard 12 at its right end. The shaft 54 is encased by a tubular housing 57 connected to a belt housing 58 which in turn is connected to a tubular housing 59 for the shaft 52. The housing 59 is journaled on the shaft 54 so as to enable the feed rollers 51 and its associated mounting structure to be raised pivotally about the shaft 54 free of the stack of sheets 15 in the magazine 14.

The shaft 54 is coupled by a train of two gears 60 and 61 to a ratchet wheel 62 all of which are journaled in the right standard 12. At the inner side of the ratchet wheel there is a vertical lever 63 pivoted at its lower end to the standard 12 as at 64. Pivotally connected to the upper end of this lever is a pawl 65 engaging the ratchet wheel in response to a spring 65*a*. The lever 63 has a depending arm 63*a* connected to a tension spring 56 to urge the lever 63 forwardly into a position defined by engagement of the arm 63*a* against a stop 66 as shown in FIGURE 2. The lever 63 is however shiftable rearwardly by action of a roller 67, mounted on a cover plate 68 on the right end of the drum, against the inclined end face of a bar 69 pivoted at 70 to the lever 63. The bar 69 is normally located in a downwardly-inclined position wherein the inclined end face thereof is out of the path of the roller 67. This position is defined by the bar resting on a roller 71 mounted on a bell crank lever 72 pivoted at 73 to the right standard 12 and coupled by a pin-slot connection 74 to a lever arm 75 secured to the shaft 29 of the cam lever 28. When the cam lever is moved to operate position the bell crank lever is moved to an upright position to place the bar 69 in a horizontal position as indicated by the dash-dot fractional showing of these parts in FIGURE 3. Thus, as an incident of shifting the cam lever 28 into an operate position to start a record of ejection, the sheet-feed mechanism is conditioned to be operated by the drum during the ejecting operation. The roller 67 may be located about radially in line with the drive pins to cause the feed mechanism to operate at about one-half revolution of the drum following the start of the ejecting operation. Each feed operation is adapted to turn the rubber-tired rollers 51 about one-fourth revolution to feed off the topmost sheet from the stack 15 into a loading position.

Figures 5, 6:
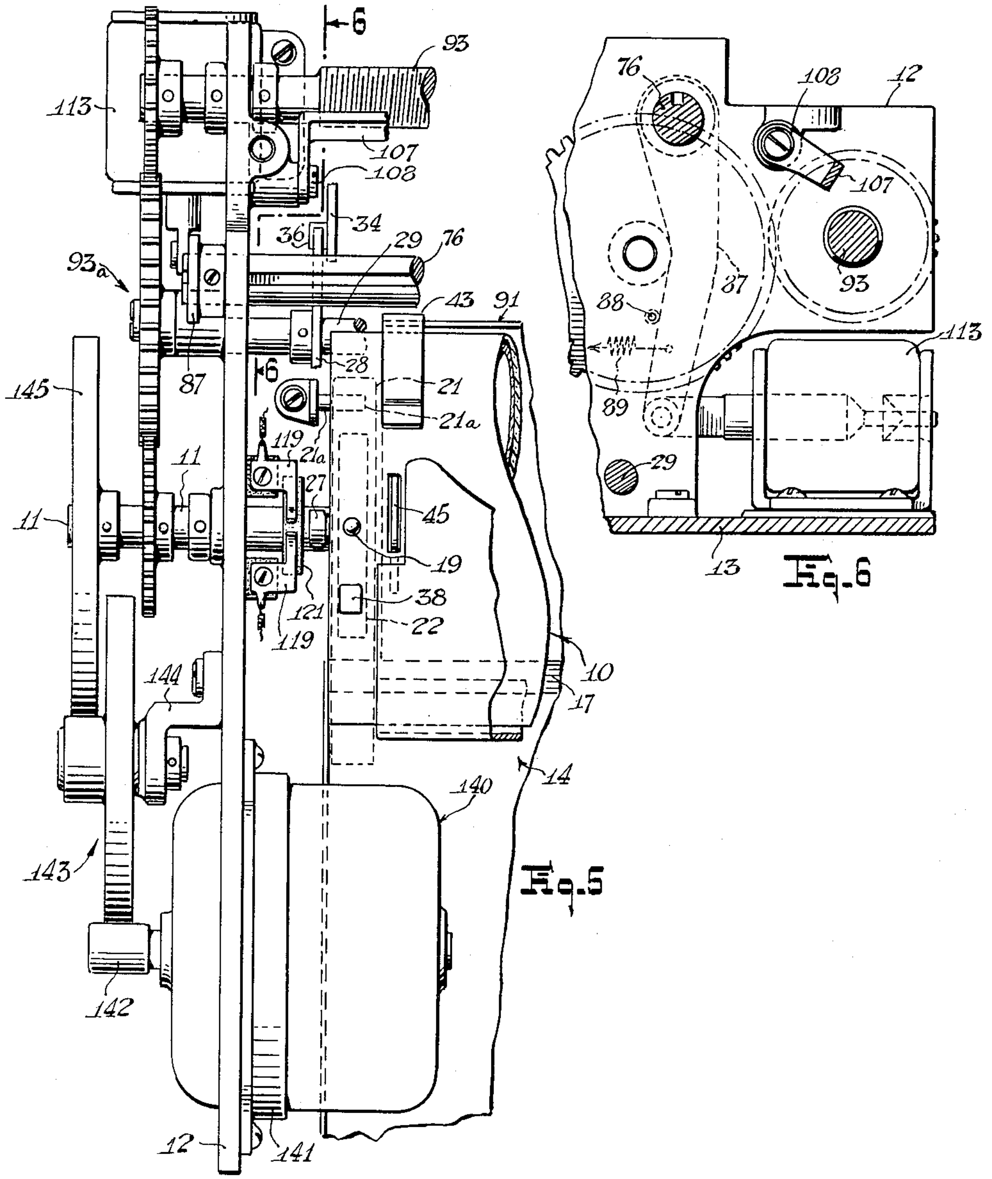
FIGURE 5 is a top plan view of the rearward lefthand portion of the mechanism illustrating the drive system.
FIGURE 6 is a fractional, sectional view taken substantially on the line 6—6 of FIGURE 5.
Figure 7:
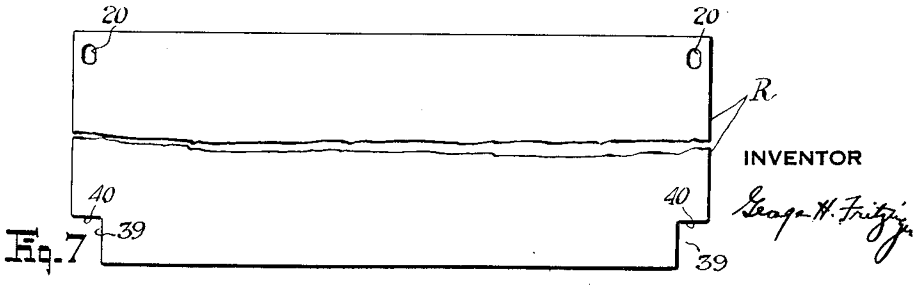
FIGURE 7 is a view of the leading and trailing portions of a sheet record with the intermediate portion thereof broken away.

At the rearward upper portion of the machine there is a cross rod 76 mounted in the side standards at its ends. Slidably mounted on this rod is a carriage 77 comprising a sleeve 78 and a U-shaped structure 79 mounted on the end portions of the sleeve as indicated in FIGURES 1–4. Within the U-structure there are two bushings 80 and 81 carrying depending arms 82 and 83. Mounted on the lower end portions of these arms are erase and record-reproduce heads 84 and 85. The carriage is keyed at 86 to the rod 76 and the rod is normally held fixed by an arm 87 secured to the left end thereof and bearing against a stop pin 88 under influence of a tension spring 89 as shown in FIGURES 5 and 6. This arrangement permits the carriage to be tilted counterclockwise to return the carriage to start position as will appear. Tension springs 90 connected to the respective arms 82 and 83 serve to urge the translating heads yieldably against the drum, there being an opening 91 in the lower part of the guide structure 18 to provide access of the heads to the drum throughout the length of travel of the carriage.

The carriage is driven progressively to the right by engagement of a feed nut 92 thereon with a feed screw 93 journaled at its ends in the standards 12 and driven in fixed relation with the drum at the same speed thereof by a train of gears **93*a* shown in FIGURES 5 and 6. The coupling of the carriage to the feed nut is of a type adapted to permit back-spacing of the carriage in a step-by-step manner as whenever a dictator wishes to listen back to a prior portion of his recording. To this end the carriage is urged constantly towards its starting position by a cord 94 leading therefrom to a torsionally-biased drum 95 at the left side of the machine, and the feed nut is provided universally to the carriage. For instance, the carriage has a rearwardly-extending arm 96 to which is pivoted at 97 a gimbal 98 (FIGURES 3 and 4). The gimbal has upstanding lugs at its ends pivoted at 99 to downwardly-extending lugs of a top plate 101 which carries the feed nut 92 on the underside of the rearward portion thereof as shown in FIGURE 2. Extending downwardly from the arm 96 are side lugs pivoted at 102 to upwardly-extending lugs of a lower plate 104. The plate 104 carries a stop nut 105 engageable with the underside of the feed screw. The two plates 101 and 104 are urged towards each other by an interconnected spring 106 to press the feed nut normally into engagement with the feed screw, but the lower stop nut is held normally disengaged by a bail 107 extending crosswise of the machine and pivoted at its ends 108 in the side standards 12 and 12*a*. This bail passes through the space between the top plate 101 and the rearwardly-extending arm 96 of the carriage and bears slidably against a lug 109 extending upwardly from the lower plate 104 to hold the stop nut disengaged. The bail is held in normal position by an arm 110 at one end thereof, which is urged clockwise, as it appears from the right end of the machine, against a stop pin 111 by a spring 112**.

The arm 87 can be rocked by a solenoid 113 to tilt the whole carriage structure counterclockwise. A stop lug 114 is provided on the carriage arm 96. This lug comprises a portion underlying the top plate 101 and another portion extending thereabove to the right side thereof. When the carriage structure is tilted upwardly this stop lug comes to bear against the underside of the top plate 101 to rock it with the carriage and to disengage the feed nut 92 from the feed screw 93. The stop nut remains disengaged during this tilting of the carriage because it is at all times controlled by the bail 107. Accordingly, when the solenoid 133 is energized to tilt the carriage upwardly, the carriage is snapped back instantly to its start position by the spring-driven drum 95.

The top plate 101 is urged leftwardly with respect to the carriage arm 96 by a light spring 115 connected between the plate 101 and a second upstanding lug 117 on the carriage arm 96 offset at a clearance spacing to the left of the top plate. This spring 115 is normally overpowered by the return force exerted by the drum 95 on the carriage. Consequently, the position of the top plate is normally one defined by its abutment against the stop lug 114. However, when the bail 107 is rocked upwardly as by a solenoid 116 connected to the arm 110, the lower plate is first released to enable the stop nut 105 to engage the feed screw under influence of the tension spring 106 and maintain the carriage locked to the feed screw, and next the bail lifts the top plate to disengage the feed nut 92. As soon as the feed nut is disengaged, the top plate is swung leftwardly against the stop lug 117 on the carriage arm 96. Upon deenergizing the solenoid 116 the sequence of events is reversed: the feed nut 92 is reengaged, the stop nut is disengaged, and the top plate 101 is swung rightwardly against the stop lug 114 by the return force of the drum 95 on the carriage with consequent backspacing of the carriage by one step. Upon successively energizing the solenoid 116, the carriage is backspaced by successive steps, each step being determined by the spacing between the stop lugs 114 and 117.

The drive system for the machine illustrated in FIGURE 5 comprises a motor 140 passing through a mounting hole in the left standard 12 and fixed therein by a mounting ring 141. The motor has a drive shaft 142 frictionally engaging the larger diameter portion of a stepped intermediate wheel 143 journaled to the left standard on a bracket 144. The smaller diameter portion of the stepped intermediate wheel frictionally engages a wheel 145 secured to the shaft 11 of the record-supporting drum. As aforementioned, the feed screw 93 is driven in unison with the drum through a train of gears **93*a*. Start-stop operation of the drum is effected, for example, by using a motor of the quick-start type and connecting it across the power line through a start-stop switch 146 (FIGURE 9); alternatively, the bracket 144 carrying the stepped intermediate wheel 143 may be pivoted on the side standard 12** and be moved back and forth into and out of engagement with the drive train by a solenoid (not shown) controlled by a suitable start-stop switch.

Figure 9:
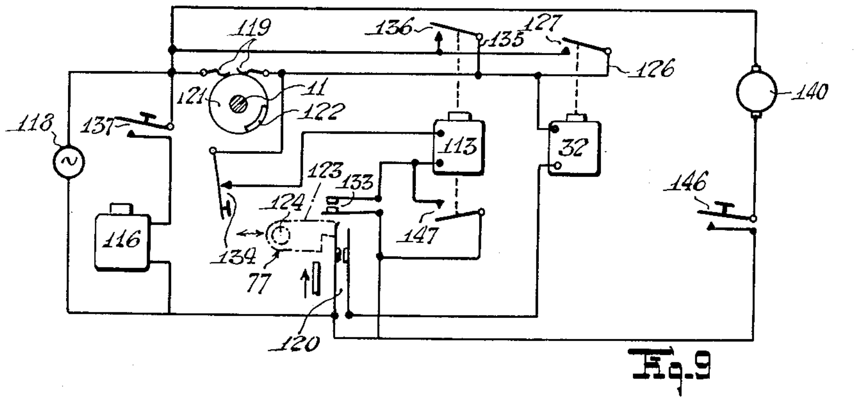
FIGURE 9 is a schematic circuit diagram showing the control circuitry and certain related mechanical components of the machine.

The control of the different components of the machine is coordinated by the circuitry shown in FIGURE 9. The eject solenoid 32 is connected across a power source 118 through a pair of slip ring contacts 119 and an end switch 120 controlled by the carriage 77. The contacts 119 ride on a slip ring 121 mounted on the shaft 11 of the record-supporting drum 10 and carrying a bridge member 122 for closing the contacts momentarily during each revolution of the drum. The end switch 120 is mounted at the right side of the machine below the support rod 76. This switch is normally open and is closed by the carriage when the same reaches the end of its rightward travel. For this purpose an arm 123 is pivoted at 124 to a lug 125 on the right side of the carriage and is torsionally biased clockwise as viewed from the top but is normally located in a rightwardly-extending position by a slot and stop-pin arrangement indicated at 125a in FIGURE 1. As the carriage reaches the end of its travel this arm abuts against one blade of the end switch 120 to close the latter. As this end switch is closed, the circuit is prepared to cause the eject solenoid to operate as soon as the slip ring contacts are next closed. As shown in FIGURE 3, the slip ring is so oriented on the shaft 11 that the contacts 119 are closed as the drive pins approach the exit opening 41 at the back of the drum. As soon as the solenoid 32 is operated to move the cam lever 28 into an operate position for starting the ejecting cycle, a holding circuit 126 is closed by contacts 127 of the solenoid to complete the circuit across the slip ring contacts and to maintain the solenoid operated independently of the slip ring. Thus the circuit of the eject solenoid is prepared when the carriage reaches its end position, but the eject solenoid is not operated until the leading edge of the sheet record approaches the ejecting slot.

Figure 9A:
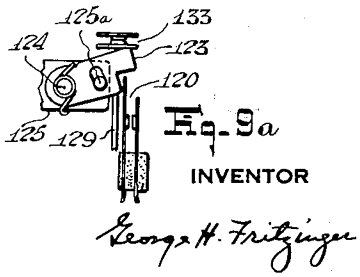
FIGURE 9*a* is a showing of a portion of the circuit of FIGURE 9 illustrating the manner in which the end switches are operated during an intermediate stage of the eject-reload cycle.

As the cam lever 28 is operated by the eject solenoid 32 the sheet feed mechanism is prepared, as before explained, so that it will be operated at the instant the drum is turned about one-half revolution from the start of the eject cycle, this operation being effected by impingement of the roller 67 on the drum against the inclined end of the bar face 69 to cam the latter forwardly. By this camming action the lever 63 is actuated to move the drive rollers 51 through one-quarter turn. By this movement of the drive rollers the topmost sheet of the stack 15 in the magazine 14 is fed into a loading position. As soon as the roller 67 passes the end of the bar 69 the latter is returned rearwardly to its initial position by the spring 56. When the bar 69 was first actuated forwardly, a side pin 128 on the bar was moved in front of an adjacent slide 129. This slide is mounted for both horizontal and tilting movement by a pin-slot mounting 130 at its rearward portion and by engagement with a slotted bracket 131 at its forward portion. The slide is urged forwardly and downwardly by a spring 132 as shown in FIGURES 1 and 2, the most forward position of the slide being defined by the pin-slot mounting 130 and the vertical positioning of the forward portion of the slide being defined by its engagement with the slotted bracket 131. The return movement of the bar 69 therefore actuates the slide rearwardly. As the slide is so moved rearwardly it strikes the arm 123 on the carriage and moves it off of the end of the blade of the end switch 120 to allow this end switch to open. However, the arm 123 becomes cocked in an inclined position against the end of the switch blade as shown in FIGURE 9*a*. By this reopening of the end switch 120 the eject solenoid is deenergized. Upon so deenergizing the eject solenoid the cam lever 28 is returned and the bell crank lever 72 is shifted to lower again the bar 69 out of the path of the roller 67 on the drum. All of these actions occur before the drive pins reach the loading position at the bottom of the drum. As the drive pins are next moved past this loading position they will pick up the next sheet record directly behind the sheet record being ejected.

An effect of cocking the arm 123 against the end of the movable blade of the end switch 120 is to close a second switch 133 in the manner illustrated in FIGURE 9*a*. The switch 133 is connected serially in the circuit of the carriage return solenoid 113, which circuit includes the source 118, the slip ring contacts 119 and the normally closed end switch 134 positioned at the left side of the machine corresponding to the start position of the carriage. Thus, when the slip ring contacts are again closed, the solenoid 113 is operated to release the carriage and permit its instant return by the drum 95. However, the period of energization of the solenoid 113 is independent of the period of closure of the slip ring contacts. For instance, as the solenoid 113 is operated it closes a pair of holding contacts 147 paralleling the switch 133. The opening of switch 133 which occurs as the carriage starts its return travel therefore does not break the circuit of the solenoid. Also, the solenoid has a holding circuit 135 including a second pair of holding contacts 136 controlled by the solenoid and paralleling the slip ring contacts 119. Thus, the reopening of the slip ring contacts is ineffective also to break the circuit of the solenoid 113. However, as soon as the carriage reaches its start position it impinges against the end switch 134 to deenergize the solenoid and enable immediate reengagement of the feed nut with the feed screw. In this way, energization of the solenoid is maintained only during its return travel to enable immediate restoration of the forward progressive feed of the carriage at the instant the carriage is returned to its start position and, as a consequence, the recording gap between the records is reduced to a minimum.

To permit backspacing of the carriage step by step there is provided a manual switch 137 connected in a circuit across the power source 118, which circuit serially includes the backspacing solenoid 116.

A continuous operation of the machine from one record to the next without introducing any appreciable recording gap between records in an important feature enabling the continuous recording of conferences, telephone conversations and other matters of indefinite length notwithstanding that the record medium is in the form of a series of separate sheets. However, when the machine is used as a phonograph player for playing a series of individual recordings, such as popular musical numbers, a substantial time break between successive records of the order at least of the duration of one revolution of the drum is desirable. This can be accomplished by orienting the slip ring 121 so that the contacts 119 are closed to cause the cam lever 28 to be moved into operate position just prior to the drive pins reaching the exit opening 41, and in also positioning the sheet feed actuating roller 67 so that it will have passed the bar 69 just prior to the slip ring contacts being closed. In the embodiment shown and heretofore described, the roller 67 is approximately radially in line with the drive pins (FIGURE 2). If this roller is now set back clockwise as it appears in FIGURE 2 by approximately 110° from the drive pins, then the drive pins will have passed the loading station before the roller 67 will have actuated the sheet feed mechanism. Thus the drum will not pick up a sheet record during the ejecting cycle but will have to be advanced through a further full revolution before the drive pins will pick up the next sheet record. Except for the failure of the drive pins to pick up the sheet record during the ejecting revolution of the drum, the sequence of operations remains the same as before, that is, when the sheet feed mechanism is released by the roller 67 passing off the end of the bar 69, the slide 129 is given a rearward impulse to open the switch 120 and close the switch 133. The opening of the switch 120 will again restore the cam lever 28 to inoperate position and the sheet feed mechanism to an inoperate condition before the drive pins reach the eject opening 41, and the closing of the switch 133 will cause immediate activation of the solenoid 113 because of the slip ring contacts 119 being then closed. Energization of the solenoid 113 causes an instantaneous return of the carriage to start position before the drive pins will have passed the exit opening 41. During the onward movement of the drum nothing further occurs until the drive pins next pick up the sheet record at the loading station and move it past the translating heads to restart the operation of the machine.

The embodiments of my invention herein particularly shown and described are intended to be illustrative and not limitative of my invention since the same are subject to changes and modifications without departure from the scope of my invention, which I endeavor to express according to the following claims.

I claim:

1. In a phonograph including a record support, and a translating-head carriage mounted for traveling movement across said support: the combination of means for progressively advancing said carriage including a drive transmission disengageable by a rocking movement of the carriage; spring-loaded means connected to said carriage for returning the same to a start position upon disengagement of said drive transmission; electromechanical means for rocking said carriage to disengage said drive transmission; a circuit including an end switch operable by said carriage when the carriage reaches a terminal position for supplying current to operate said electromechanical means; and a holding switch connected in parallel with said end switch and operably closed by said electromechanical means as the latter is operated for maintaining said drive transmission in a disengaged condition during the full return of said carriage.

2. The combination set forth in claim 1 including a second switch operable by said carriage upon its return to start position for breaking said circuit to deenergize said electromechanical means and cause the reengagement of said drive transmission immediately upon the return of the carriage.

3. In a phonograph including a record support, and a translating-head carriage mounted for traveling movement across said support: the combination of means for progressively advancing said carriage including a drive transmission disengageable by a rocking movement of the carriage; spring-loaded means connected to said carriage for returning the same to a start position upon disengagement of said drive transmission; electrically-operable means for rocking said carriage to disengage said drive transmission; a circuit for said electrically-operable means including a preparing switch and a second switch both of which must be operated to energize said electritrically-operable means; means for ejecting a record from said support when said carriage reaches a terminal position including means operable during the eject cycle to operate said preparing switch; and means operable by said support when the same reaches a predetermined position after said preparing switch is operated for operating said second switch whereby to energize said electrically operable rocking means and cause said carriage to be returned to start position.

4. The combination set forth in claim 3 including respective holding circuits paralleling said preparing switch and said second switch, said holding circuits being closed by operation of said electrically-operable means to maintain disengagement of said drive transmission during the return of said carriage irrespective of the positioning of the carriage and of the rotational positioning of said record support.

5. In a phonographic machine including a record-supporting device and a translating-head carriage device one of which is adapted to be moved progressively with respect to the other: the combination of a feed screw and a cooperating feed nut movably mounted on said one device for progressively moving the latter as the feed screw is turned; and backspacing means for said one device comprising a second feed nut movably mounted on said one device and normally disengaged from said feed screw, and means for alternately engaging said feed nuts with said feed screw.

6. In a phonographic machine including a record-supporting device and a translating-head carriage device one of which is adapted to be moved progressively with respect to the other: the combination of a feed screw and a cooperating feed nut movably mounted on said one device for progressively moving the latter as the feed screw is turned; and backspacing means for said one device comprising a second feed nut normally disengaged from said feed screw, means for alternately engaging said feed nuts with said feed screw, means mounting said first-mentioned feed nut for backspacing movement along said feed screw with respect to said one device, means for backspacing said first-mentioned feed nut along said feed screw by one step upon each release thereof from said feed screw, and means for propelling said one device backwardly by the distance of said one step upon each release of said second feed nut.

7. In a phonographic machine including a record support, and a translating head mounted for traveling movement across said support: the combination of a carriage for said head, a cross rod on which said carriage is both slidably and rockably mounted, a feed screw supported in spaced parallel relation to said cross rod, a feed nut for coupling said carriage to said feed screw, a first arm pivoted to said carriage and carrying said feed nut, bias means connected to said arm to hold said feed nut engaged with said feed screw, a rigid arm fixed to said carriage and movable against said pivoted arm by a rocking movement of said carriage from a normal position on said cross rod for disengaging said feed nut, a bail parallel with said cross rod and mounted for rocking movement against said pivoted arm to disengage said feed nut independently of said carriage said bail being provided with a stop member for defining an unoperated position thereof free of said first pivoted arm, means biasing said bail against said stop, and a second pivoted arm on said carriage movable against said bail in a direction of movement of the bail away from said stop, said feed nut bias means being connected to said second arm with the second arm being urged against said bail but with an insufficient force to displace the bail from its said stop member.

8. The combination set forth in claim 7 including a second feed nut on said second pivoted arm held normally at a clearance distance from said feed screw by said bail, means for rocking said carriage about said cross rod to disengage said first feed nut while said second feed nut is held disengaged also by said bail, spring means connected to said carriage for returning the same instantly when said first feed nut is so disengaged, means for rocking said bail to release said second pivoted arm to engage said second feed nut with said feed screw under influence of said feed nut bias means and thereupon shift said first pivoted arm to disengage said first feed nut, means providing a limited lateral movement of said first arm relative to said carriage, and means laterally biasing said first arm in a carriage-return direction, said carriage returning means overpowering the lateral biasing force on said first arm normally to hold the arm shifted laterally against its forward stop whereby upon rocking said bail to disengage said first feed nut and to engage said second feed nut said first pivoted arm is shifted in a carriage-return direction by its lateral biasing means and upon returning said bail to reengage said first feed nut and thereupon disengage said second feed nut said carriage is shifted backwardly by one step through a distance determined by the limited lateral movement of said first arm relative to the carriage.

9. In a phonographic machine including a record support, and a translating head mounted for traveling movement across said support: the combination of a carriage for said head, a cross rod on which said head is both slidably and rockably mounted, a feed screw supported in spaced parallel relation to said cross rod, a fixed arm on said carriage extending in a direction towards said feed screw, first and second arms on said carriage at opposite sides of said fixed arm and extending past opposite sides of said feed screw, said first arm having a universal pivotal connection with said carriage and said second arm being pivoted to the carriage for movement only towards and away from said feed screw, stop means limiting the lateral movement of said first arm relative to the carriage, first and second feed nuts on said first and second arms respectively, a tension spring connected between said first and second arms, a bail extending along said cross rod and acting against said second arm normally to withhold the second feed nut from said feed screw and being shiftable to release said second arm for engagement of the second feed nut with the feed screw under influence of said tension spring and thereupon to shift said first arm to disengage said first feed nut, a first spring means biasing said carriage in a return direction, and a second spring means laterally biasing said first arm in a carriage-return direction, said first spring means overpowering said second spring means to hold said first arm shifted laterally against its forward stop while said first feed nut is engaged and said second feed nut is disengaged from the feed screw.

References Cited in the file of this patent

UNITED STATES PATENTS

| | | |
|---|---|---|
| 2,016,887 | Brown | Oct. 8, 1935 |
| 2,212,672 | Somers | Aug. 27, 1940 |
| 2,589,035 | Begun et al. | Mar. 11, 1952 |
| 2,652,259 | Keller | Sept. 15, 1953 |
| 2,672,346 | Roberts | Mar. 16, 1954 |
| 2,946,593 | Beger | July 26, 1960 |